Sept. 2, 1930.  R. W. HILTON  1,775,039
AEROPLANE BRAKING SYSTEM
Filed Oct. 30, 1929   2 Sheets-Sheet 1

Ralph W. Hilton
INVENTOR
BY Victor J. Evans
ATTORNEY

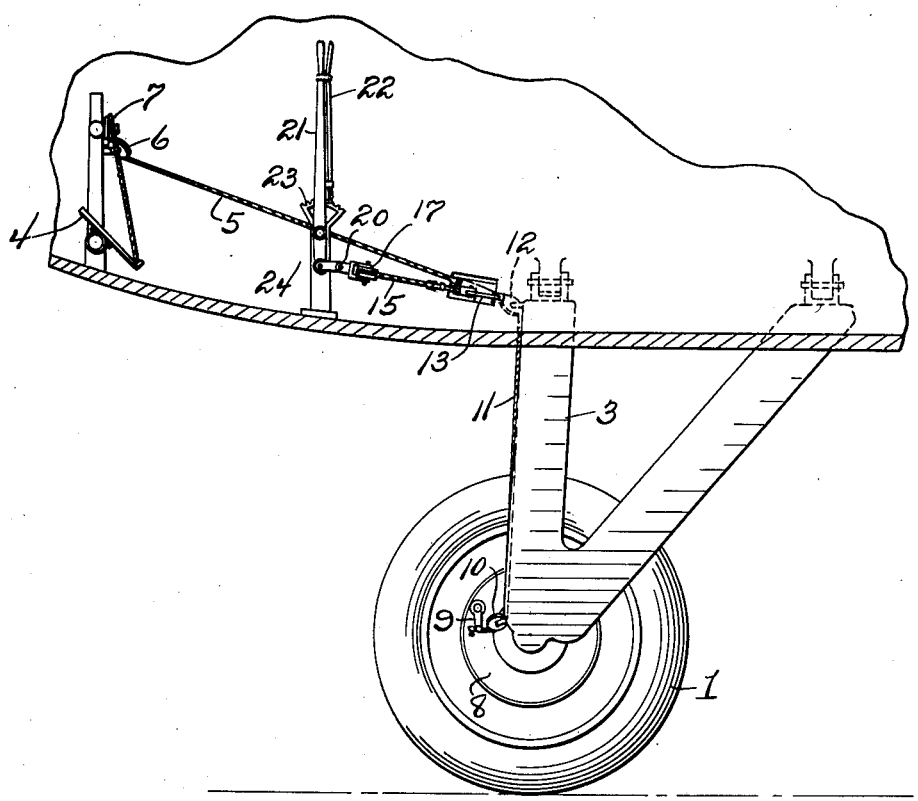

Patented Sept. 2, 1930

1,775,039

UNITED STATES PATENT OFFICE

RALPH W. HILTON, OF WICHITA, KANSAS, ASSIGNOR OF ONE-HALF TO HARVEY W. BROWN, OF WICHITA, KANSAS

AEROPLANE BRAKING SYSTEM

Application filed October 29, 1929. Serial No. 403,547.

This invention relates to brakes for the landing wheels of aeroplanes, and has as its primary object to overcome certain disadvantages which attend the operation of ordinary landing wheel brakes. In the ordinary braking system now employed, there are two foot pedals provided, one a right foot pedal and the other a left foot pedal, and cables are led to the brake levers for the right and left wheels from these levers respectively. In order to effect a perfect landing and the braking of the wheels in this type of control, it is absolutely necessary that precisely the same degree of pressure be exerted upon both pedals and as this is practically impossible of accomplishment, unless the brakes are fully applied, which of course is undesirable, in landing, the wheel, the brake of which is controlled by, for example, the right foot, if the pedal is subjected to greater foot pressure than the left foot pedal will be retarded, but the other wheel, upon the brake lever for which a lighter pressure is exerted will be caused to rotate and as a consequence there will be a slewing of the aeroplane, and this will cause the tail end of the plane to hit the ground and swing from one side to the other and very likely result in a serious accident.

Therefore the present invention contemplates the provision of a brake control embodying means whereby the brakes of the right and left landing wheels may be selectively and independently applied or simultaneously applied by the depression of the usual individual foot pedals, in combination with hand lever actuated means for simultaneously applying both brakes with precisely the same braking pressure of the shoes to brake drums of the two wheels, so that in making a straight landing, the brakes may be controlled by the hand lever alone and the lever so adjusted as to regulate the degree of pressure exerted upon the brake drums, thereby insuring of a landing of the aeroplane without any deviation whatsoever from a straight course, and therefore avoiding such accidents as are liable to occur when the ordinary brake controls are employed.

Another object of the invention is to provide a brake control for aeroplanes comprising a combination of control elements, above referred to, in which actuation of the one will be entirely independent of the other.

This invention also consists in certain other features of construction and in the combination and arrangement of the several parts, to be hereinafter fully described, illustrated in the accompanying drawings, and specifically pointed out in the appended claims.

In describing my invention in detail, reference will be had to the accompanying drawings wherein like characters denote like or corresponding parts throughout the several views, and in which:—

Figure 2 is a front to rear sectional view taken substantially on the line 2—2 of Figure 1.

Figure 1:
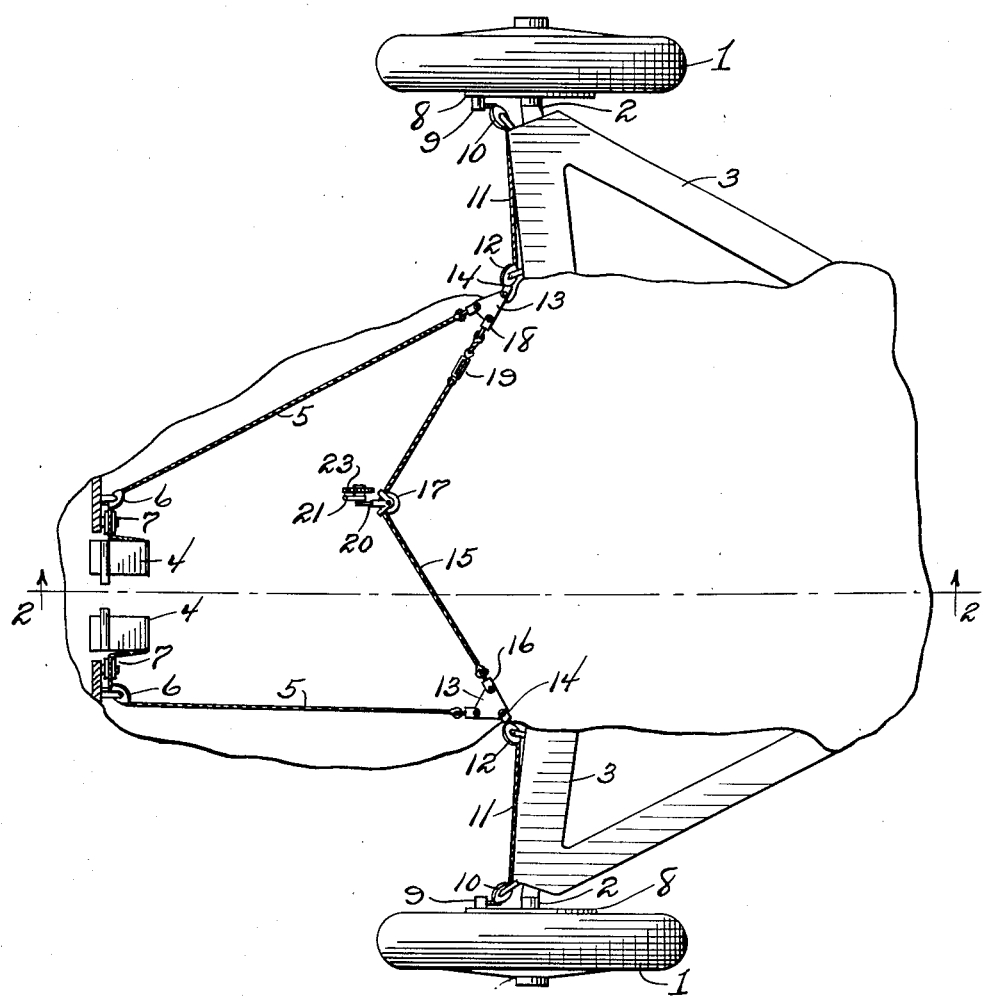
Figure 1 is a plan view of the brake control mechanism embodying the invention installed upon an aeroplane, only so much of the aeroplane as is necessary to an understanding of the invention being illustrated.

In the drawings the landing wheels are indicated by the numeral 1 and are mounted upon the usual spindles 2 supported by preferably V-shaped struts 3 as shown in the drawings. The foot pedals are indicated by the numeral 4 and correspond to the ordinary foot pedals employed for this purpose, a cable 5 being connected with each foot lever and passing over a pulley 6 mounted at a suitable angle of inclination and over a transversely disposed pulley 7 adjacent the respective pedal 4. The numeral 8 indicates in general the brake drum for each landing wheel, and the numeral 9 indicates the lever which is to be rocked for the purpose of applying or releasing the brake. Pulleys 10 are mounted upon the lower portions of the struts 3 and a cable 11 is connected at one end to the brake lever 9 and trained about the pulley 10 and about another pulley 12 at the upper forward portion of the respective strut 3, the other end of the cable being connected to one corner of a triangular connecting member 13 which may be of sheet metal, this connection being preferably by way of a yoke 14 pivotally connected with said corner and to which yoke the cable end is connected. The respective cable 5 is connected to another corner of the triangular connecting member 13 and a cable 15 is connected at one end to the other corner of one of the connecting members 13 by a pivoted yoke 16, and is led to a pulley 17 and connected at its other end by a swivel yoke 18 to the other corner of the other connecting member 13, a turn-buckle 19 being interposed in the cable 15, preferably adjacent its last mentioned end so that the cable may be suitably adjusted as regards its length.

The pulley 17 is connected by a swivel joint 20 with the lower end of a hand lever 21 carrying the usual pawl actuating means, indicated in general by the numeral 22, coacting with the segmental rack 23, mounted on a standard 24 upon which the lever 21 is also pivoted.

From the foregoing description of the invention and from an inspection of the drawings and particularly Figure 1 thereof, it will be evident that the actuation of either foot pedal 4 will effect application of the respective brake 8 as, due to the pull exerted upon the cable 5 and the consequent pull upon the cable 11, the brake for the respective wheel will be applied, but the brake for the other wheel will remain idle. It will also be understood that both pedals may be simultaneously depressed, as before stated and as is customary in the present brake controls, so as to simultaneously apply the brake for the two wheels.

As before indicated, the present invention differs from the ordinary brake control inasmuch as it comprises, in combination with the old structure embodying only two foot pedals, the hand lever 21 which, in the operation of the control embodying the invention, when it is desired to brake both wheels simultaneously and with the same braking effect, this may be accomplished by a swinging of the hand lever 21 about its pivot so as to exert a pull upon the cable 15 through the medium of the pulley 17, and as the intermediate portion of the cable is trained over the pulley and freely movable thereover, and the pulley engages the cable at a point midway its ends, it is quite evident that the pull upon the two strips of the cable must be equal, under all conditions.

Therefore, in controlling the brakes for the landing wheels by the present invention, the necessity of exercising care to exert exactly equal frictional pressure on the two brakes, simultaneously, through the medium of the foot pedals is wholly obviated. At the same time, the advantage which may be gained by the use of foot pedals to independently control the brakes for the two landing wheels, are obtainable by the present invention by merely leaving the hand lever latched in a manner to slacken the cable 15 so that if it is desired to make a turn, on landing, the pedals may be so employed and, when it becomes necessary to stop, after making the turn, the pedals may be released and the hand lever operated to exert a uniform pull upon each of the stretches of the cable 15.

What I claim is:—

1. In a brake control for the landing wheels of an aeroplane, the combination with the levers of the brakes, of foot pedals, and a hand lever, a cable connected to the lever of each brake, a cable connected with each foot lever and directly with the lever of the respective brake, and a cable connected with the hand lever and directly with the levers of both of the brakes, whereby the brake of either landing wheel may be applied by the actuation of the corresponding foot lever independently of the brake of the other landing wheel and whereby the brakes of both landing wheels may be equally applied, independently of the pedal connected cables, for simultaneously applying the brakes of both wheels, in equal degree.

2. In a brake control for the landing wheels of an aeroplane, the combination with the levers of the brakes, of cables, each connected with the lever of a respective one of the brakes, a connecting element to which each cable is connected, a foot pedal for the application of each brake, a cable connecting each foot lever and connecting element together of the respective brake, a hand lever mounted to be held in different positions of adjustment, and a cable connected to the connecting members and at its intermediate portion to the said hand lever whereby the brake of either landing wheel may be applied by the actuation of the corresponding foot lever independent of the brake of the other landing wheel whereby the brakes of both landing wheels may be equally applied independently of the pedal connected cables, for simultaneously applying the brakes of both wheels, in equal degree.

3. In a brake control for the landing wheels of an aeroplane, the combination with the levers of the brakes, of cables, each connected with the lever of a respective one of the brakes, a connecting element to which each cable is connected, a foot pedal for the application of each brake, a cable connecting each foot lever and connecting element, a hand lever mounted to be held in different positions of adjustment, and a cable connected at its ends to the connecting members and at its intermediate portion to the said hand lever whereby the brake of either landing wheel may be applied by the actuation of the corresponding foot lever independent of the brake of the other landing wheel and whereby the brakes of both landing wheels may be applied equally independently of the pedal connected cables, for simultaneously applying the brakes of both wheels, in equal degree, the connection of the last mentioned cable with the hand lever comprising a swiveled pulley connected to the hand lever and about which the intermediate portion of the cable is trained.

4. In a brake control for the landing wheels of an aeroplane, the combination with the levers of the brakes, of cables, each connected with the lever of a respective one of the brakes, a connecting element to which each cable is connected, a foot pedal for the application of each brake, a cable connecting each foot lever and connecting element, a hand lever mounted to be held in different positions of adjustment, a cable connected at its ends to the connecting members and at its intermediate portion to the said hand lever whereby the brake of either landing wheel may be applied by the actuation of the corresponding foot lever independent of the brake of the other landing wheel and whereby the brakes of both landing wheels may be equally applied independently of the pedal connected cables, for simultaneously applying the brakes of both wheels, in equal degree, the connection of the last mentioned cable with the hand lever comprising a swiveled pulley connected to the hand lever and about which the intermediate portion of the cable is trained, and means interposed in the last mentioned cable for adjusting the length thereof.

In testimony whereof I affix my signature.

RALPH W. HILTON.